United States Patent

Cricchi et al.

[15] 3,683,335

[45] Aug. 8, 1972

[54] NON-VOLATILE MEMORY ELEMENT AND ARRAY

[72] Inventors: James R. Cricchi, Baltimore; William W. Beydler, Laurel, both of Md.

[73] Assignee: Westinghouse Electric Corporation, Pittsburgh, Pa.

[22] Filed: June 24, 1970

[21] Appl. No.: 49,398

[52] U.S. Cl................340/173 R, 307/238, 307/279, 317/234 T, 317/235 B

[51] Int. Cl............................G11c 11/40, G11c 5/06

[58] Field of Search...........340/173 R; 307/238, 279; 317/234 I, 234 UA, 235 B

[56] References Cited

UNITED STATES PATENTS 3,549,911 12/1970 Scott......................317/235 B

*Primary Examiner*—Eugene G. Botz
*Assistant Examiner*—R. Stephen Dildine, Jr.
*Attorney*—F. H. Henson and E. P. Klipfel

[57] ABSTRACT

A metal insulated semiconductor (MIS) field effect transistor is operated in a gate-to-source mode. The voltage threshold of conduction of the transistor is variable and is switched between two different stable threshold conditions in response to application of corresponding, different predetermined values of polarizing voltages applied between the gate and source terminals. Determination of the threshold condition to which the transistor is switched is effected by applying a read voltage to the gate of the transistor intermediate the voltage threshold levels and sensing the current flow between the source and drain. Since the sense voltage is less than the polarizing voltage for either condition of switching, the preset threshold condition is maintained. The transistor therefore exhibits a non-volatile memory capability. A plurality of the transistors are employed in a memory array and may be readily fabricated in integrated circuit form.

8 Claims, 13 Drawing Figures

NON-VOLATILE MEMORY ELEMENT AND ARRAY

BACKGROUND OF THE INVENTION

1. Field of the Invention

The invention relates to field effect transistors particularly of the metal insulator semiconductor (MIS) type and particularly to operation of such transistors in a gate-to-source mode as memory elements.

2. Description of the Prior Art

Heretofore in the prior art, magnetic cores have typically been employed as the memory elements in memory arrays. Magnetic cores provide for information storage and retrieval through the mechanism of effecting magnetic flux changes. The existing flux condition of a magnetic core can be sensed a limited number of times without changing that condition and thus without destroying the stored information. Magnetic core arrays are also desirable in that the magnetic memory is retained in the absence of standby power and are therefore non-volatile. Whereas magnetic core memories have achieved wide-spread usage, they nevertheless present disadvantages in that arrays employing such cores are undesirably large and are difficult to fabricate and, in addition, require substantial power during switching.

Heretofore in the prior art, semiconductors have found only limited usage as memory elements since they have no inherent properties permitting long-term information storage in a single element. Particularly, two transistors connected for example in a flip-flop configuration, or more, are required for each bit of storage imposing size and cost disadvantages. Memory retention also requires standby power. These and other reasons have limited the use of transistors and semiconductor devices of the prior art as memory elements.

Recently, metal insulator semiconductors (MIS) field effect transistors, also known as insulated gate field effect transistors have been utilized as memory elements. As disclosed in application Ser. No. 722,639, filed Apr. 19, 1968, by J.R. Szedon, T. L. Chu and E. A. Sack, assigned to the assignee of the present application, and now abandoned, such devices when operated in the gate to substrate mode have demonstrated a memory capability. Particularly, the devices as therein disclosed can be switched between two different stable threshold conditions in response to corresponding polarizing voltages and permit non-destructive readout of the condition.

SUMMARY OF THE INVENTION

The invention comprises a circuit configuration for operation of an MIS field effect transistor in a gate-to-source mode to permit switching between two different stable threshold conditions for providing a memory capability and a memory array employing a plurality of such transistors. The memory array thus constructed is non-volatile, i.e., has a non-destructive readout capability and does not require standby power for retaining the stored information.

In operation, the element is switched to a desired threshold condition by the application of a corresponding polarizing voltage between the gate and source and may be set to the other threshold condition or cleared as the case may be by the application of the other predetermined polarizing voltage. The threshold condition of the transistor is determined, or in the sense of a memory element the transistor is read out, by applying a sense or read voltage of a value preferably intermediate the threshold voltages between the gate and source of the transistor and determining the current flow in the source to drain conduction path of the transistor.

The MIS transistors exhibit a hysteresis characteristic, of substantially rectangular waveform, as a function of the applied polarizing voltage in establishing the two threshold conditions. Thus, they are capable of retaining the stored information without the application of standby power. The application to the element of a sense voltage, preferably of value intermediate the threshold levels but in any event less than the polarizing voltages, therefore does not affect the threshold condition to which the device has been set and permits a non-destructive readout.

The memory array of the invention provides for incorporating a plurality of the MIS transistors connected in the gate-to-source mode and for selectively accessing these elements to provide the writing and reading functions of the array. The memory array incorporating the elements may be readily fabricated in integrated circuit form.

These and other advantages and features of the invention will become more apparent and be more readily understood from the following detailed description of the invention.

DETAILED DESCRIPTION OF THE INVENTION

Figure 1:
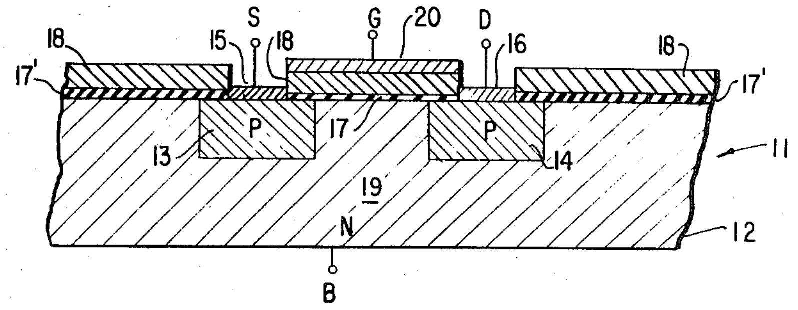
FIG. 1 shows in cross-section an MIS transistor suitable for employment in the present invention.

FIG. 1 shows a cross-section of an MIS field effect transistor 11 of the type employed in the invention. The MIS transistor 11 has an epitaxial layer of N type semiconductor material, preferably silicon, shown at 12 which forms a substrate for the device 11. A body electrode B provides a contact with the substrate 12. A source region 13 and a drain region 14 are formed by diffusions of P type semiconductor material into the substrate 12. A coating 15 of electrically conductive material such as aluminum is provided on a central portion of the source region 13 to provide a source electrode S. Similarly, a coating 16 of electrically conductive material forms a contact with a central portion of the drain region 14 to provide a drain electrode D. A layer 17' and a thin layer 17 of an insulating material such as silicon dioxide are formed on the surface of the substrate 12, as indicated, with the exception of the surface contacted by the coatings 15 and 16. In addition, a layer 18 of insulating material such as silicon nitride is formed over the insulating layers 17 and 17'. The portion 19 of the substrate intermediate the regions 13 and 14 provides what is defined as a P-channel region, the functions and characteristics of which are described in more detail hereafter. A conductive layer 20 such as aluminum contacts the insulating layer 18 over this P-channel region 19 and the portions of the regions 13 and 14 to provide a gate electrode G.

The silicon nitride insulating layer 18 is 500–1,000 angstroms in thickness while the silicon dioxide insulating layer 17 is only 20–100 angstroms in thickness. The thicknesses of these two layers may be varied to vary the characteristics of the device although generally the nitride layer is relatively thick with respect to the oxide layer. The silicon dioxide insulating layer 17' is 1,000–5,000 angstroms in thickness and the thickness of the layer 17' does not materially affect the operating characteristics of the transistor 11. Due to the use of the nitride and the oxide layers, the MIS transistor 11 of FIG. 1 is also known as a metal nitride oxide semiconductor (MNOS) transistor comprising a species of the MIS transistors.

The insulating layers 17 and 18 of a transistor having the construction of FIG. 1 may be formed of different materials than those specified. The necessary characteristics of the materials selected, however, include that the respective current flows through the insulating layers in response to the application of a common electrical field to them be of different levels, thereby to establish a charge storage in the layers and accordingly establish the threshold voltage of the device. Suitable alternative materials include aluminum oxide for the insulating layer 18 and silicon dioxide for the thin insulating layer 17.

As a further alternative to the construction specifically shown in FIG. 1, N type diffusions may be provided in the regions 13 and 14 in a P type substrate to provide a so-called N-channel type MIS transistor.

Figure 2:
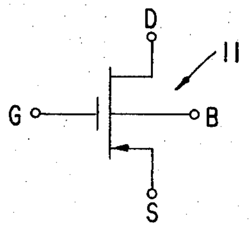
FIG. 2 shows a schematic representation of an MIS transistor of the type of FIG. 1.

In FIG. 2 is shown a schematic diagram of the transistor 11 of FIG. 1 in which the numeral 11 again identifies the transistor including, as previously noted, a gate electrode G, source electrode S, drain electrode D, and body electrode B. Current flow in the transistor 11 is bidirectional and thus the source electrode S and drain electrode D are defined in accordance with the biasing supplied; particularly, the drain electrode D is defined as the P type diffusion region to which the more negative bias is applied. Bias sources are not shown in either of FIGS. 1 or 2 since conventional biasing circuits are well known to those skilled in the art. Thus, in accordance with the notations S and D, it will be understood that the more negative biasing with respect to the substrate is applied to the drain electrode D and thus, in FIG. 1, to the P type region 14. Current flow occurs from the source to the drain electrode and thus in the direction of the arrow indicated in FIG. 2. In a typical circuit configuration, the body electrode B is connected to a source of reference potential, such as ground.

The MIS transistor 11 has a variable voltage threshold which may be selectively switched between two stable threshold levels as is more fully hereinafter described. In general, and in accordance with the circuit connections as above described, the characteristics of conduction of the transistor is represented by the equation:

$$(1)\ I = K(V_{gs} - V_t)^2$$

where I is the source to drain current, $K$ is a constant depending upon the particular type of MIS transistor, $V_{gs}$ is the control voltage applied between the gate and source electrodes, e.g., corresponding to the read signal when the transistor is used as a memory element, and $V_t$ is the threshold voltage of the transistor, noted earlier to be a value which is variable between two stable conditions.

The variable threshold voltage of the MIS transistor 11 is believed to result from and constitute a function of charge storage in the oxide and nitride layers 17 and 18 in FIG. 1. This charge storage is further believed to result from the unequal current flow through the respective layers for a given electrical field established thereacross, the amount of charge being selectively increased or decreased as a function of the sense or direction of the field. As more fully explained hereinafter, a low voltage threshold of conduction corresponds to a small charge storage condition and a high voltage threshold of conduction corresponds to a large charge storage condition, the threshold further varying between the stable conditions as a function of that same charge storage.

As also explained more fully hereafter, the charge storage condition and thus the threshold condition is selectively adjusted by application of a so-called polarizing voltage or potential to the transistor 11 and particularly, in accordance with the present invention, application thereof between the gate and source electrodes of the device. To simplify the following discussion, reference will be made to a positive polarizing voltage thus applied which establishes a large charge voltage condition and produces the first stable condition of the device, and to a negative polarizing potential which establishes a low charge storage condition and produces the second voltage threshold condition. The second threshold condition is of lower absolute magnitude than the first. For example, where both threshold voltages are negative, the lower or first is the lower magnitude of the two. Since the polarizing voltages are preferably of square waveshape, they effect a relatively rapid shift between the two stable threshold conditions.

Figure 3:
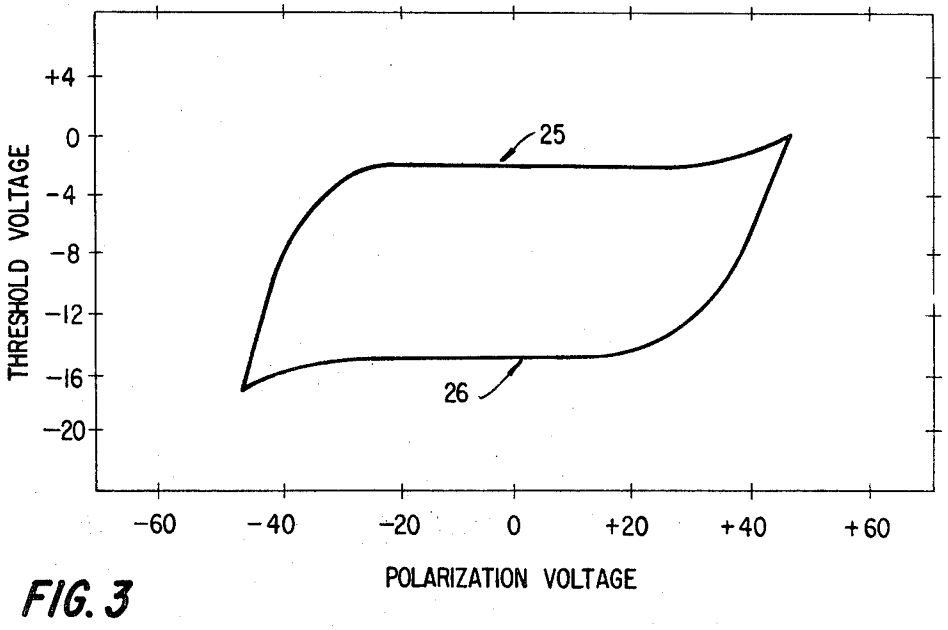
FIG. 3 is a plot of the voltage threshold as a function of polarization voltage of an MIS transistor as in FIG. 1 operated in the gate-to-source mode and illustrating a hysteresis response of the voltage threshold to the polarization voltage applied.

In the graph of FIG. 3, the threshold voltage of a device such as transistor 11 is plotted as a function of the polarization voltage. The voltage threshold characteristic of the device and thus the threshold voltage as a function of the polarization voltages, defines a hysteresis curve having a first stable threshold region 25 of approximately −2 volts and a second stable threshold region 26 of approximately −15 volts, the region 26 being relatively more negative in potential than the region 25. The threshold region 25 thus is the lower magnitude voltage threshold and corresponds to the lower charge storage condition above noted.

Shifting between the two stable threshold regions 25 and 26 is effected by the application of polarization voltages of appropriate polarity and magnitude, as readily discerned from the graph of FIG. 3. Particularly, a positive polarization voltage in excess of approximately 45 volts will shift the variable threshold to the first stable region 25 in which condition the transistor 11 will remain throughout subsequent applications of gate to source voltages of from approximately +30 volts to −30 volts without affecting that condition. Correspondingly, application of a negative polarization voltage in excess of about −45 volts will shift the transistor to the second stable threshold at approximately −15 volts. Subsequent applications of gate to source voltages of from about +20 to about −40 volts, and thus again a range of some 60 volts will not affect the threshold condition.

The threshold characteristic of the transistor 11 thus defines a substantially rectangular hysteresis curve and permits for convenient use of the transistor as a two-state or digital memory element. A very significant feature or characteristic of the MIS transistor employed in the invention is that the two stable threshold conditions are maintained by the device without standby power. This is believed to result from the inherent charge storage capability of the device with substantially negligible leakage whereby the device can maintain the threshold condition to which it has been set for indeterminate periods of time.

The characteristic illustrated in FIG. 3 will be recognized by those skilled in the art to represent operation of the P-channel type transistor of FIGS. 1 and 2 in the enhancement mode. More specifically, and with reference to the equation (1) above, a first threshold of −2 volts thus requires that $V_{gs}$ exceed −2 volts for effecting conduction in the first threshold condition and thus that $V_{gs}$ must be greater than −2 volts, for I to be greater than zero. A −2 volts or less gate to source control voltage will produce a zero value of source to drain current.

The MIS transistors may be constructed to operate in the so-called depletion mode wherein, with zero volts bias applied between the gate and source electrodes, the drain current is greater than zero. Since the enhancement mode condition of FIG. 3 is more convenient, it is preferred for use in the memory array of the invention although appropriate circuitry could, of course, be provided for use of the P-channel depletion mode transistor as noted. Further, the two stable voltage thresholds of a given device may result in the first threshold corresponding to depletion mode conduction and the second threshold to enhancement mode conduction.

As noted above in relation to FIG. 3, the positive and negative polarizing voltages respectively shift the device to the relatively more positive and more negative, i.e., first and second, thresholds. In this device, as also noted earlier, the current of the oxide insulating layer dominates the current of the nitride insulating layer and controls the charge storage function as is presently understood.

Variable threshold devices of this same general type having two stable threshold regions are also known wherein, however, positive and negative polarizing voltages shift the voltage threshold to more negative and more positive stable regions, respectively. In these devices, the current of the nitride insulating layer exceeds and dominates the current of the oxide insulating layer. This latter type of device is, of course, directly equivalent to that shown and disclosed herein and may be employed in place thereof in the practice of the present invention.

Figure 4A:
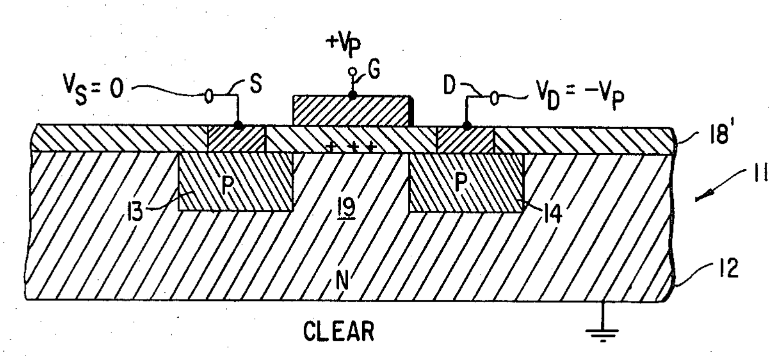
FIGS. 4*a*, 4*b*, and 4*c* show cross-sections of the MIS transistor of FIG. 1 modified to contain schematic indications of the clear, set, and retain conditions.
Figure 4B:
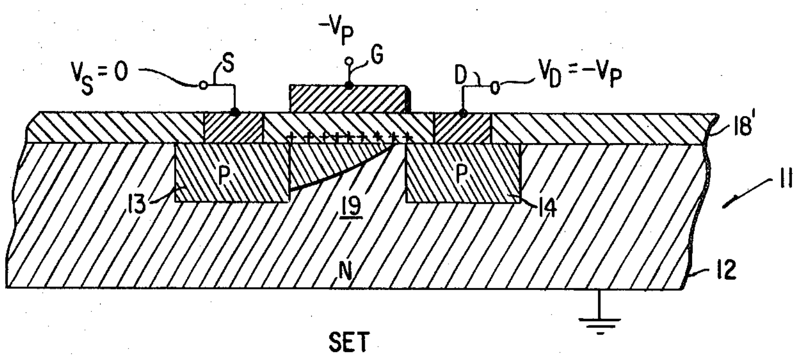
Figure 4C:
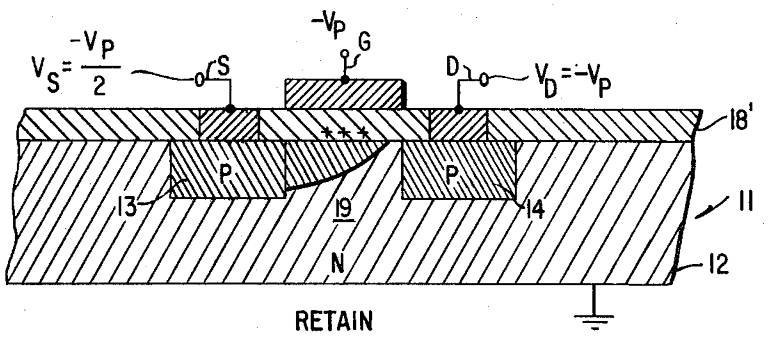

FIGS. 4*a* through 4*c* comprise cross-sections of an MIS transistor identified by the numeral 11 and generally corresponding to that of FIG. 1. The transistors 11 of FIGS. 4*a* through 4*c* include an insulating layer 18′ generally representing both the oxide insulating layers 17 and 17′ and the nitride layer 18 of FIG. 1 for the sole purpose of simplifying the illustration. In all three modes, the N type substrate 12 is connected to a source of reference potential such as ground, as indicated, and the drain electrode D is connected to a source of drain potential selected to be the polarizing voltage $-V_P$. The gate and source electrodes are energized in accordance with the operation to be performed. The relationship between the drain and source electrode potentials requires that the drain voltage $V_D$ be at least as negative as the source voltage $V_S$; the use of a drain voltage equal to the polarizing voltage $-V_P$ minimizes the fields produced between the gate and drain and is therefore preferred.

To perform the clear mode of operation shown in FIG. 4*a*, there is applied to the source electrode a potential of zero volts or $V_S = 0$ and to the gate electrode the positive polarization voltage $+V_P$. As represented in FIG. 3, the variable threshold voltage of the device 11 is thereby shifted to the first stable threshold region 25. As will appear hereafter, in an array of such devices, the clear mode is employed to clear all of the transistors in the array preparatory to a writing operation for recording information in the array.

In the set mode of operation shown in FIG. 4*b*, such as that corresponding to a write operation for recording a bit of information in a selected transistor of an array, the source electrode S is maintained at zero volts or $V_S = 0$ as in the clear mode. A negative polarizing potential $-V_P$ is applied to the gate electrode G, rendering the gate negative with respect to the source and shifting the variable threshold voltage to the second stable voltage threshold region 26.

To assist in visualizing the internal operating mechanism of the MIS transistor 11 in FIGS. 4*a* through 4*c*, the clear state is illustrated in FIG. 4*a* by presence of a minimum positive charge in the insulating layer 18′ adjacent the P-channel 19. In response to the application of the negative polarizing potential $-V_P$, and thus in the set mode shown in FIG. 4*b*, substantial positive charge is developed in the insulating layer 18 resulting in an increased bias defined by a change of cross-hatching in the P-channel region 19.

In the retain mode of operation shown in FIG. 4c, the first stable voltage threshold established in the clear mode of FIG. 4a is maintained. Although the negative polarizing voltage $-V_P$ is applied to the gate electrode, a voltage is applied to the source electrode which, relative to that applied to the gate electrode effects a total voltage between the gate and source electrodes which is insufficient to change the stable threshold condition and particularly is insufficient to switch the transistor to the second threshold condition. Conveniently, the voltage applied to the source is one-half of the negative polarizing voltage or $V_S = -_{VP}/2$ which, for the illustrated gate voltage $V_G=-V_P$ provides a gate to source voltage of $V_{gs} = -\frac{1}{2}V_P$. The source voltage shown to be $V_S = V_P/2$ may be of any value relatively to the gate voltage as long as the difference between the gate and source electrode voltages is sufficiently less than the negative polarizing voltage $-V_P$ that the transistor 11 is not switched from its first stable voltage threshold.

The small amount of positive charge occurring in the insulating layer 18' in relation to the P-channel region 19 corresponds to that of the clear mode of FIG. 4a, in turn representing the status of the transistor 11 in the first threshold condition. An increased bias region, defined by a change of cross-hatching, is again developed in the P-channel region 19 as a result of the resultant gate to source voltage as illustrated in FIG. 4c.

Although in the above description the more positive threshold voltage was illustrated in FIGS. 4a and 4c by a lesser positive charge, it is possible for a negative charge to develop in the P-channel transistor 11. This operation results when the transistor 11 is formed in a different manner to operate in the depletion mode.

For convenience in the following description of the use of the transistor 11 as an element of a memory array, the first stable voltage threshold of the clear mode will be arbitrarily selected to designate storage of binary "0" while the second stable voltage threshold of the set mode of FIG. 4b is arbitrarily designated to represent the storage of binary "1".

In operation as a memory element, the transistor 11 is first subjected to the clear mode by applying a positive polarizing voltage $+V_P$ to the gate electrode as shown in FIG. 4a. The transistor responds by assuming the first threshold condition represented as the region 25 in FIG. 3.

In the write operation, a data bit signal is connected to the source electrode S. The data bit signal is at ground potential for a binary "1" corresponding to the set condition of FIG. 4b, and is applied to the source electrode S, the gate electrode having applied thereto the negative polarizing potential $-V_P$ to effect operation of the transistor 11 in the set mode of FIG. 4b. The transistor 11 is thereby switched to the second stable voltage threshold condition to effect the storage of a binary "1".

If a binary "0" is to be written or recorded, a voltage $-V_P/2$ is applied to the source electrode simultaneously with the application of the voltage $-V_P$ to the gate electrode as shown in FIG. 4c. As noted earlier, the transistor 11 maintains the first stable voltage threshold condition established in the clear mode of FIG. 4a.

In the foregoing clearing and writing operations, unipolar data voltage as is conventional in logic circuitry is applied to the source electrode in each of the set and retain modes of operation of FIGS. 4b and 4c; by contrast, a bipolar polarizing voltage is applied to the gate electrode G during the clear mode of operation and the write sequence involving the set and retain modes of FIGS. 4b and 4c.

The transistor 11 of FIGS. 4a and 4b may also be operated as a memory element when utilizing only the clear and set modes of FIGS. 4a and 4b respectively. In such an operation, the data or bit line connected to the gate electrode G is employed for selectively applying either a positive or a negative polarizing voltage to the gate electrode G to effect storage of a binary "0" or a binary "1", respectively, while the source electrode S is maintained at zero volts. A disadvantage in this operation i.e., an operation which does not include the retain mode, is that bipolar polarizing voltages of much larger magnitude are required in the junctions of the logic controlling the data line and, further, a conversion from conventional unipolar logic to bipolar logic is required.

Figure 4D:
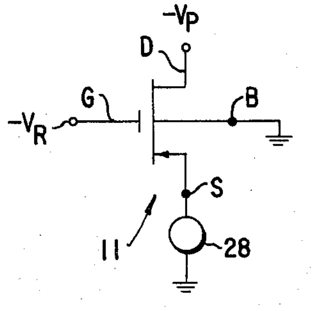
FIG. 4*d* is a schematic diagram of a read circuit for an MIS transistor operated in the gate-to-source mode in accordance with the invention.

Reading of the memory element provided by transistor memory element 11 requires that the transistor be interrogated to determine which of the stable voltage threshold conditions currently exists. A schematic of a suitable read circuit for this purpose of interrogating the memory element is shown in FIG. 4d. In the read or interrogate circuit, the transistor element 11 comprising the memory element is connected at its drain electrode D to a drain voltage source producing an output $V_D$ which is equal, typically, to the polarizing voltage $-V_P$. The gate electrode G is connected to a read voltage $-V_R$, the latter in turn being intermediate the value of the two stable voltage thresholds and thus less than the magnitude of the polarizing voltage $V_P$.

Assuming that the transistor memory element 11 is in the first threshold condition comprising a stable threshold voltage $V_{t1}$, the read voltage $-V_R$ applied to the control gate electrode G will render transistor 11 conductive. Current thereupon flows from the source electrode S to the drain electrode D and a voltage $-(V_D - V_{t1})$ is displayed by meter 28 connected to the source electrode S. If the transistor memory element 11 is in the second threshold condition, the read voltage $-V_R$ applied to the gate electrode G is insufficient to activate the transistor 11 and the latter remains in the off condition inhibiting the flow of current between the source electrode S and the drain electrode D. As a result, zero volts are indicated by the meter 28.

Figure 5:
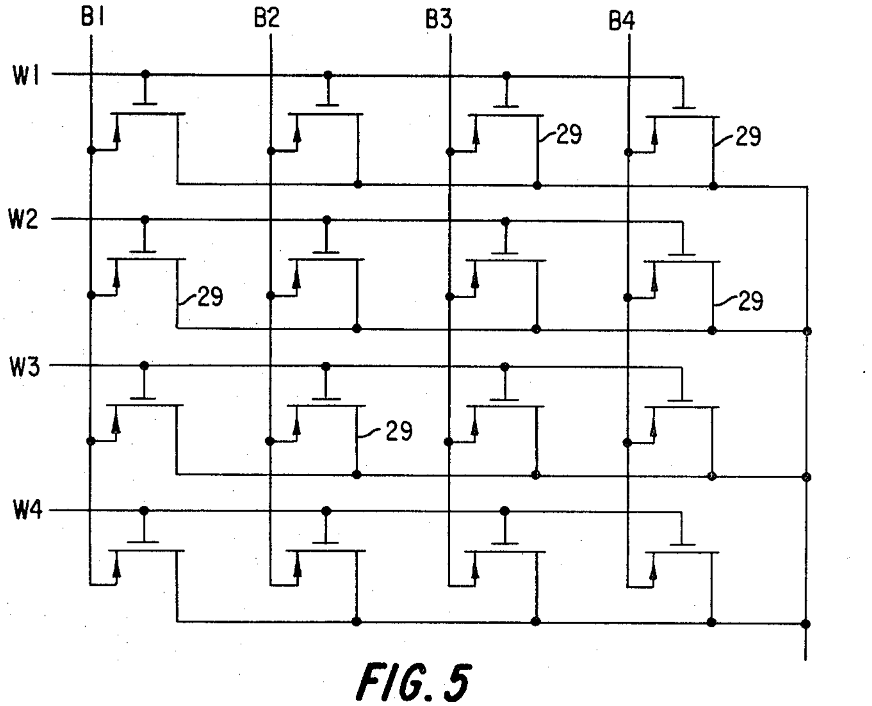
FIG. 5 is a schematic diagram of a memory array of MIS transistors operated in the gate-to-source mode and having common read and write functions all in accordance with the invention.

FIG. 5 shows a memory array utilizing MIS transistors having a variable threshold voltage as above described. In the array of FIG. 5, common read and write lines are employed providing common read and write functions.

A plurality of MIS transistor elements 29 are arranged in a four by four matrix, with the body electrode (not shown) of each element being connected to ground. A bit line B1 is connected to the source electrodes of each transistor element in the first column of the memory array. Similarly, bit lines B2, B3, and B4 are connected to the gate electrodes of each of the transistor elements in the remaining columns in the matrix array. A word line W1 is coupled to the gate electrodes of each transistor element in the first row of the array, with similar word lines W2, W3, and W4 being provided for the remaining rows of the array. The drain electrodes of all the memory elements 29 are connected to a common conductor 27 to which is applied a negative drain voltage $-V_D$ preferably equal to the polarizing voltage $-V_P$.

In the use of the memory array, the transistor elements 11 are selectively and initially operated in the clear mode preparatory to the write mode for storage of either "0" or "1" bits respectively corresponding to the retain and set modes all as above described, and subsequently when storage has been effected, on the read mode or sequence. For convenience, and as referred to hereinafter, the terminology of a clear selected element defines an element, i.e., a transistor, of the memory array which has been selected for operation in the clear mode. Similarly, the terminology of write selected element and of read selected element define selected transistors of array operated in the write and read sequences and thus either the set or the retain modes of operation.

In the clear mode of operation, a positive polarizing voltage $+V_P$ is applied to the word line of a clear selected element and zero volts is applied to the bit line of that element, thereby causing the clear selected element to assume the first stable threshold condition.

In the write sequence, the data signal representing either a binary "1" or binary "0" is applied to the bit line of the selected element and a negative polarizing voltage $-V_P$ is applied to the word line for that same element. As above discussed, a binary "0" data signal supplies a potential of $-V_P/2$ volts and is applied to the source electrode of the write selected element whereby the element assumes the retain mode of operation of FIG. 4*c* maintaining the first threshold condition established in the initial clear operation as in FIG. 4*a*. By contrast, a binary "1" data signal supplies zero volts to the bit line which in turn is applied to the source electrode of the write selected element and, in conjunction with the negative polarizing voltage $-V_P$ applied to the word line and thus to the gate electrode of that same write selected element, causes the latter to switch to the second stable threshold condition.

In the read sequence, the read voltage $-V_R$ is applied to the word line of the read selected element. The bit line of the read selected element is interrogated to determine whether the element is in the first or second threshold condition. If in the first threshold condition, the read voltage during the read sequence renders the element conductive and thus a flow of current in the source to drain conducting path exists and the source voltage thus is substantially equal to the drain voltage or $-V_P$. More specifically, a negative voltage of magnitude $(V_D - V_{t1})$ is produced on the selected bit line. However, if the read selected element is in the second threshold condition, the read voltage $-V_R$ does not render it conductive and no flow of current results. The source voltage remains at zero volts. The on or off condition corresponding to the transistor being in the first or second threshold condition is thus readily detected by any conventional detecting circuit in response to the flow of current and/or voltage change generated during the read cycle. A representative sensing circuit is shown in FIG. 4*d*.

Figure 6:
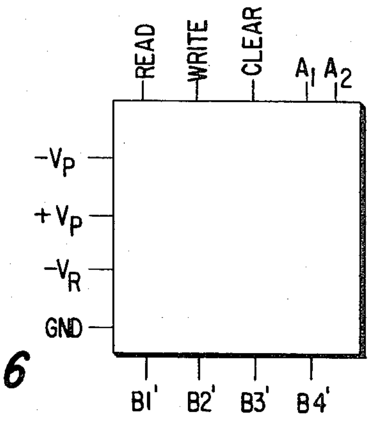
FIG. 6 is a schematic representation of an integrated memory array circuit chip.

The memory array is particularly suitable for fabrication utilizing integrated circuit techniques and a schematic diagram of a typical memory chip is shown in FIG. 6. The chip 30 of FIG. 6 includes a memory array of the general construction illustrated in FIG. 5 and additional circuits such as address decoder logic, word drivers, bit drivers, and sense amplifiers, later described in detail. The chip 30 has a number of input terminals including those for the polarizing voltages $-V_P$, and $=V_P$ for the read voltage $-V_R$, and a ground connection as well as terminals for supplying control signals to initiate the read, write, and clear functions. The terminals B1′ through B4′ are provided for coupling the data signals to the bit lines and terminal A1 and A2 are provided for receiving binary address signals identifying the particular word line to be selected.

Figure 7:
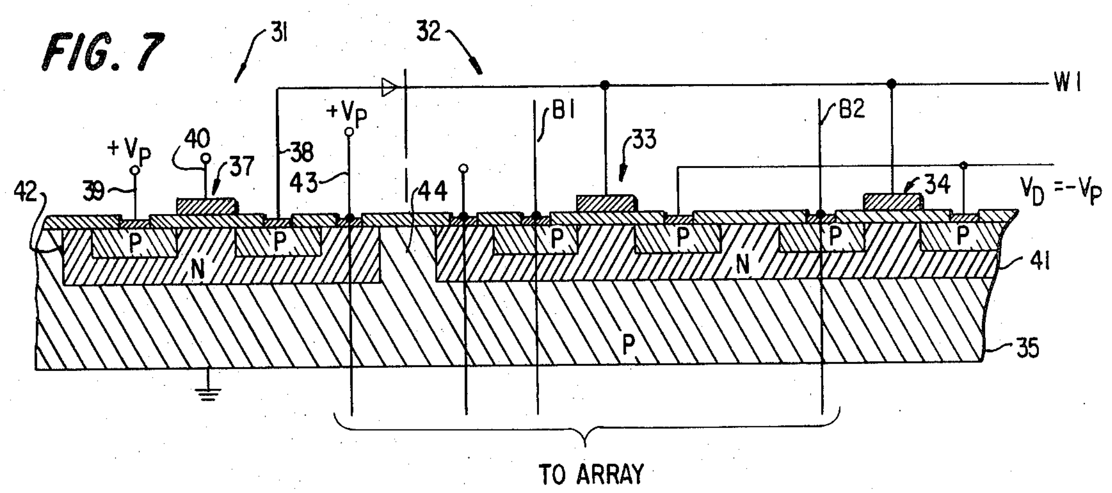
FIG. 7 shows a cross-section, in partial portion, of an integrated circuit chip.

In FIG. 7 is shown a cross-section, in partial portion, of the integrated memory chip 30 shown in FIG. 6. As explained more fully in relation to FIGS. 8 and 9, chip 30 includes an address and control portion 31 and a memory array portion 32. Only part of the address and control portion 31 has been shown in the cross-section of FIG. 7 and particularly comprises a transistor 37 which is the word driver of the address circuitry 31, selection of the word driver as the part to be shown being explained hereafter. In the array portion 32, two representative MIS transistors 33 and 34 are shown. All of the elements of the memory chip are disposed on a P type substrate or body 35.

With regard to the memory array portion 32, the source electrodes of the transistors 33 and 34 are connected to bit lines B1 and B2, respectively, and the gate electrodes of the transistors are connected to word line W1. Isolation between the individual memory element transistors such as 33 and 34 is provided solely by the relative biasing of the source and drain junctions or regions and their alternating sequence within the substrate 41. Corresponding to FIG. 1, the source and drain regions are noted by the designation P and the substrate by the designation N.

The word driver transistor 27 of the address and control circuitry 31 is connected at its drain electrode 38 to the work line W1 and at its source electrode 39 to a source of polarizing voltage $+V_P$. Address logic circuitry, not shown, is connected to the gate electrode 40 of the driver transistor 37 for placing each of the memory element transistors associated with the work line W1 in the clear mode of operation. More particularly, the driver transistor 37 is rendered operable during a clear mode of operation to couple the voltage $+V_P$ at its source electrode 39 through its drain electrode 38 to the word line W1 and thus to the gate electrodes of each of the memory element transistors, such as 33 and 34, to establish the clear mode of operation.

Since the driver transistor 37 operates at the positive $+V_P$ potential as described, to prevent conduction across the PN junction of the source region and the substrate 42, the latter is connected at 43 to an equalizing or balancing voltage source of the same potential and thus $+V_P$. To assure isolation between the driver transistor 37 and the transistors such as 33 and 34 of the memory array 32, the base 35 is therefore doped with a P type diffusion. Typically, the n-type substrates 41 and 42 are formed as a single layer, and the P type diffusion is made through that layer to define the separate substrates 41 and 42 and to provide a P type diffusion barrier 44 therebetween, for isolating the address circuitry 31 and the memory array elements 32.

Figure 8:
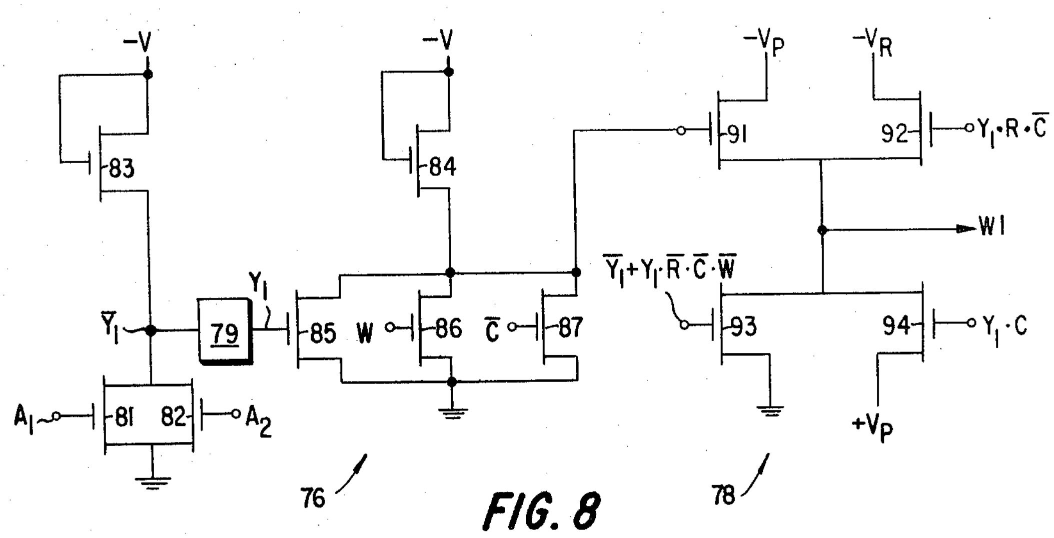
FIG. 8 is a schematic diagram of conventional address decoder logic and associated word driver circuits for the memory array of the invention.
Figure 9:
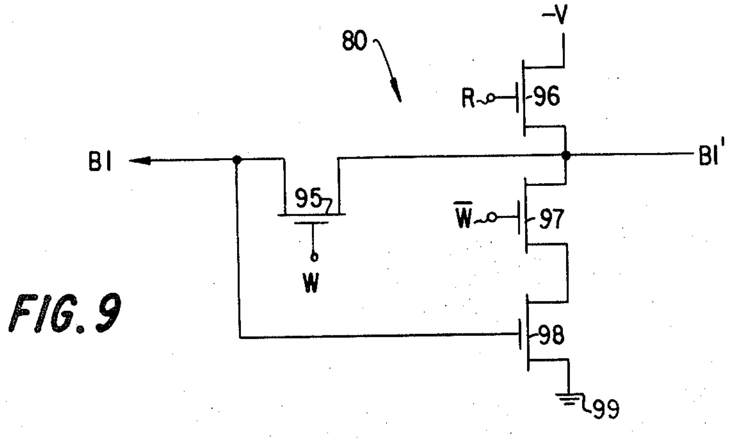
FIG. 9 is a schematic diagram of conventional bit driver and sense amplifier circuits for use in the memory array of the invention.

The address and control circuitry 31, as noted earlier, includes a number of circuits as to which in FIG. 8 is shown a schematic of a typical address decoder logic 76 and an associated word driver 78, and in FIG. 9 is shown a bit driver and sense amplifier circuit 80. The circuits of FIGS. 8 and 9 utilize conventional P-channel fixed threshold field effect transistors, each of which is switched to a conductive condition or turned "on" when a negative voltage $-V$ greater than the fixed threshold voltage is applied to the control gate and is rendered non-conductive or turned "off" when ground potential is applied to the control gate. For convenience the logic voltage $-V$ may be equal to the read voltage $-V_R$. However, if desired a separate logic supply voltage input may be provided on chip 30 in FIG. 6. In accordance with the logic circuitry set forth in the specification and including the block diagram of the memory chip 30 of FIG. 6, a voltage level of ground potential at the control terminals identified by the clear, write, and read functions represents the presence of, and thus the true condition, of the control signals C, W, and R, respectively, and the voltage level of $-V$ represents the complement of those same control signals, i.e., the absence of, or equivalently, the false condition. Selection of a word line address is made in accordance with binary signals of the address terminals A1 and A2 and particularly binary code "0" is represented by the voltage level $-V$ and binary "1" is represented by the voltage level of ground potential.

In the following description of operation, it will be assumed that the word line W1 is addressed, that line further having been arbitrarily selected for illustration in the cross-section of FIG. 7 merely for purposes of description. Further, it is assumed that the binary address for the line W1 is "11".

The addressing of word line W1 therefore is achieved by the application of ground potential signals to the address terminals A1 and A2 corresponding to the binary address "11". With reference to FIG. 8, the devices 81 and 82 are thus driven to the off state. The voltage $-V$ applied to the drain and gate electrodes of the device 83 renders it conductive and thus the voltage $-V$ is supplied through the conducting device 83 to the signal node $\overline{Y}_1$ a slight reduction in the amplitude occurring in accordance with the noted characteristics of conduction of these devices as earlier set forth. In fact, the device 83 functions as a load resistor in this operation, as is conventional in field effect transistor logic circuitry. Inverter 79 couples the signal node $\overline{Y}_1$ to the gate terminal of device 85. Device 85 is connected in parallel at its source and drain electrodes with devices 86 and 87 and, the parallel circuit thus defined is connected in series with the gate to drain current path of device 84. Device 84, as the device 83, operates as a load resistor. The signals for the write and clear operations are presented as the logic conditions for write (W) and clear not ($\overline{C}$), to the gate electrodes of devices 86 and 87, respectively.

The write operation, or sequence, corresponds to the condition $Y_1 \cdot W \cdot \overline{C}$. To perform a write operation in relation to the word line W1, the condition $\overline{Y}_1$ is true which, inverted by inverter 79 presents the true condition $Y_1$ at the gate of device 85 and likewise the true conditions W and $\overline{C}$ are presented at gate electrodes of devices 86 and 87; correspondingly, ground potential is thus presented at the gate electrodes of the devices 85, 86 and 87 turning each of them off. The voltage $-V$ coupled through the conducting device 84 thus is applied to the gate electrode of device 91, rendering it conductive and in turn applying the voltage $-V_P$ to the word line W1.

The read operation corresponds to the true condition $Y_1 \cdot R \cdot \overline{C}$ at the gate electrode of the device 92. When this condition is true, device 92 is turned on and the voltage $-V_R$ is applied to word line W1. A clear operation corresponds to the true condition $Y_1 \cdot C$ at the control gate of device 94 and renders the latter conductive to apply the voltage $+V_P$ to the word line W1. Finally, when word line W1 is not being used, the condition $\overline{Y}_1 + Y_1 \cdot \overline{R} \cdot \overline{C} \cdot \overline{W}$ is true at the gate of device 93 and the latter clamps the word line W1 to ground potential.

Address circuitry including an associated word driver os similar type, similar to that provided for line W1 is provided for each of the work lines such as W2, W3, W4 of the memory array. The circuitry thus provided generates corresponding signals Y2, Y3, and Y4 corresponding to the word lines W2, W3, and W4, respectively. Thus, with the exception of the particular decode logic circuitry responsive to the binary address signals A1 and A2, the circuit of FIG. 8 is applicable for use with each of the word lines W1 through W4.

In FIG. 9 is shown the schematic of a bit driver and sense amplifier circuit which cooperates with the word driver 78 of FIG. 8 in both the write sequence and the read operation of the memory array. In the write sequence, the write control signal which is provided to the write input terminal of the chip 30 is indicated in FIG. 6. The condition W therefore is true at the gate electrode of the device 95 rendering it conductive and thereby coupling the date line B' to the bit line B1, corresponding to the identification of the data and bit lines in FIGS. 6 and 7, respectively.

When a read operation is to be performed, the conditions R and $\overline{W}$ are true and thus ground potential is presented at the gate electrodes of devices 96 and 97, respectively, rendering them conductive and thereby coupling the potential $-V$ to the drain electrode of device 98. The control or gate electrode of device 98 which is coupled to the bit line B1 has applied to it the potential at the source electrode of the read selected memory element. In time coincidence therewith, the read voltage $-V_R$ is applied to the gate electrode of that same read selected memory element by the corresponding word line. If that read selected element has been set to the first threshold condition, the read voltage $-V_R$ will render the element conductive and the negative voltage $(V_D - V_t)$ (wherein, in this case $V_D = V_P$) is developed at the source electrode of that element and thus is coupled through the bit line B1 connected to the source electrode of that element and to the control gate of the device 98. The negative voltage thus developed renders the device 98 conductive and thus clamps the data line B1' to substantially ground potential in accordance with the connection of the source electrode of the device 98 to ground potential terminal 99 as indicated.

On the contrary, if during this same read operation, the read selected element is in the second threshold condition wherein the read voltage $-V_R$ does not exceed the threshold voltage of the device, the source electrode of the read selected element is substantially at zero volts or ground potential. Thus, the bit line B1 supplies a ground potential to the control electrode of the device 98 and the latter remains in the off or nonconducting condition. Thus, the voltage −V is coupled through the conducting device 96 to the data line B1'.

The logic circuitry shown in FIGS. 8 and 9 is representative of circuitry which is suitable for use with the memory array of the present invention. However, modified forms of the logic circuitry which are equivalents of the disclosed circuitry may also be used and the invention is not limited to any particular form of associated logic.

Figure 10:
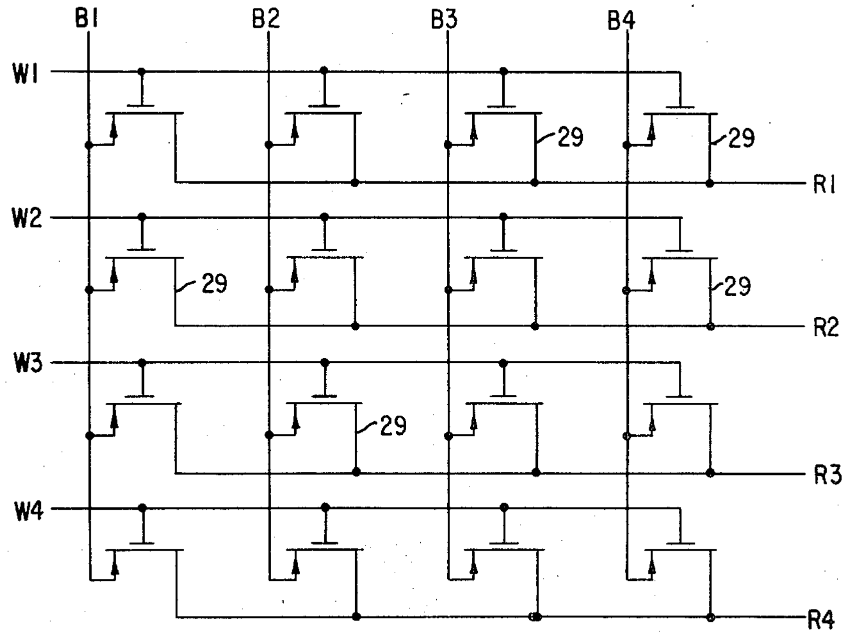
FIG. 10 is a schematic diagram of a modified embodiment of the memory array of the invention having separate read and write functions.

FIG. 10 shows a modified memory array having separate read and write functions in which the same reference characters indicate the same parts as in the memory array of FIG. 5. The array of FIG. 10 differs from that of FIG. 5 in that the drain electrodes of the memory elements in each row of the matrix are connected to the corresponding read lines R1 through R4 for the rows. In operation, the read lines R1 through R4 are individually and selectively connected to a source of drain voltage $-V_D$ in time coincidence with the addressing of the corresponding word lines W1 through W4. Thus, only the single read line corresponding to the addressed word line is coupled to the drain voltage $-V_D$. By this technique, the drain electrodes of the memory elements which are not on the selected read line are isolated from the remainder of the elements. The isolation thus afforded is desirable but not essential to the operation of the memory array of the invention.

It will be evident that modifications may be made in the system described herein without departure from the scope of the invention. Accordingly, the invention is not to be considered limited by the description, but only by the scope of the appended claims.

We claim as our invention:

1. A non-volatile memory system comprising:
an array of field effect transistors each having gate, source, and drain electrodes and each having a voltage threshold for conduction variable between first and second stable threshold conditions,
clear means for applying a first polarizing potential between the gate and source electrodes of a selected transistor of the array to cause the clear selected transistor to assume a first stable threshold condition,
write means for applying a second polarizing potential between the gate and source electrodes of a selected transistor of the array to cause the clear selected transistor to assume a second stable threshold condition, and
sense means for applying a read potential to a selected transistor of the array to detect the existing voltage threshold condition of the sense selected transistor.

2. A non-volatile memory system as recited in claim 1 wherein:
said clear means applies a positive polarizing potential as the first polarizing potential to render the gate electrode of a clear selected transistor positive with respect to its associated source electrode, and
said write means applies a negative voltage as the second polarizing potential to render the gate electrode of a write selected transistor negative with respect to the associated source electrode.

3. A non-volatile memory system as recited in claim 1 wherein said sense means includes:
means for selectively applying a read voltage of less magnitude than either of said first and second polarizing potentials to the gate electrode of the transistor selected for sensing, and
means for detecting current flow in the source to drain conduction path of a sense selected transistor.

4. A non-volatile memory system as recited in claim 1 wherein the transistors of said array are arranged in rows and columns and wherein there is further provided:
a first group of access lines connected in common to the gate electrodes of the transistors of respectively corresponding rows, and
a second group of access lines connected in common to the source electrodes of the transistors of respectively corresponding columns,
a third group of access lines connected in common to the drain electrodes of the transistors in the respectively corresponding rows,
each of said clear and write means is selectively connected in time coincidence to one each of said first and second group of access lines for applying said first and second polarizing potentials, respectively, to the corresponding selected transistors, and
said sense means is connected to said second group of access lines for detecting the voltage threshold conditions of a sense selected transistor.

5. A non-volatile memory system as recited in claim 4 wherein said third group of access lines are connected in common to a power supply terminal for energization of said transistors.

6. A non-volatile memory system as recited in claim 4 wherein there is further provided means for selectively energizing each of said third group of access lines in time coincidence with the corresponding one of said first group of access lines in energizing a selected transistor of said array.

7. A non-volatile memory system as recited in claim 4 wherein said clear means includes means for defining the access lines of said first and second groups thereof associated with a clear selected transistor for applying the first polarizing potential through the lines thus defined between the gate and the source of a clear selected transistor.

8. A non-volatile memory system as recited in claim 4 wherein said write means includes means for defining the access lines of said first and second groups thereof associated with a clear selected transistor for applying the first polarizing potential through the lines thus defined between the gate and the source of a write selected transistor.

* * * * *